United States Patent [19]

Schievelbein

[11] 4,192,382
[45] Mar. 11, 1980

[54] HIGH CONFORMANCE ENHANCED OIL RECOVERY PROCESS

[75] Inventor: Vernon H. Schievelbein, Houston, Tex.

[73] Assignee: Texaco Inc., White Plains, N.Y.

[21] Appl. No.: 936,651

[22] Filed: Aug. 25, 1978

Related U.S. Application Data

[63] Continuation-in-part of Ser. No. 863,503, Dec. 22, 1977.

[51] Int. Cl.² .................. E21B 33/138; E21B 43/22
[52] U.S. Cl. .................................. 166/269; 166/273; 166/294
[58] Field of Search ............... 166/269, 273, 274, 294

[56] References Cited

U.S. PATENT DOCUMENTS

| | | | |
|---|---|---|---|
| 2,800,962 | 7/1957 | Garst | 166/274 X |
| 2,988,142 | 6/1961 | Maly | 166/273 |
| 3,294,164 | 12/1966 | Hardy et al. | 166/274 |
| 3,330,348 | 7/1967 | Hardy et al. | 166/269 X |
| 3,827,497 | 8/1974 | Dycus et al. | 166/274 |
| 3,866,680 | 2/1975 | Dauben | 166/273 |
| 4,018,278 | 4/1977 | Shupe | 166/274 X |
| 4,085,799 | 4/1978 | Bousaid et al. | 166/273 X |
| 4,088,189 | 5/1978 | Shupe | 166/273 X |

*Primary Examiner*—Stephen J. Novosad
*Assistant Examiner*—George A. Suchfield

*Attorney, Agent, or Firm*—Carl G. Ries; Robert A. Kulason; Jack H. Park

[57] ABSTRACT

The conformance of a surfactant waterflood oil recovery process in a formation containing at least two zones of varying permeability, the permeability of one zone being at least 50 percent greater than the permeability of the other zone, is improved by flooding until the higher permeability zone has been depleted, after which a small amount of oil is injected followed by water injection for a period of time sufficient to resaturate the swept zone at least adjacent to the injection well. Next, a fluid is injected into the high permeability zone, said fluid having relatively low viscosity at the time of injection and containing surface active agents which promote the formation of a coarse emulsion in the flow channels of the formation which reduces the permeability of the high permeability zone. Since the viscosity of the fluid injected into the previously waterflooded, high permeability zone is no greater than water, it is injected easily into the zone and moves through substantially the same flow channels as water would move in the formation. After the permeability of the first zone has been reduced substantially, surfactant waterflooding may then be accomplished in the second zone which was originally not invaded by the injected fluid since its permeability was substantially less than the permeability of the first zone.

23 Claims, No Drawings

HIGH CONFORMANCE ENHANCED OIL RECOVERY PROCESS

CROSS REFERENCE TO RELATED APPLICATION

This application is a continuation-in-part of copending application Ser. No. 863,503 filed Dec. 22, 1977 for "HIGH CONFORMANCE OIL RECOVERY PROCESS".

FIELD OF THE INVENTION

This invention concerns a process for use in subterranean petroleum formations containing two or more zones which differ from one another in permeability such that surfactant waterflooding or other enhanced oil recovery processes cannot effectively deplete both zones, resulting in poor vertical conformance.

More specifically, the invention concerns a method for treating a zone which has been depleted by surfactant waterflooding, to reduce the permeability of the zone, so petroleum may be recovered from other zones by a subsequent surfactant waterflood.

BACKGROUND OF THE INVENTION

It is well recognized by persons skilled in the art of petroleum recovery that only a small fraction of the petroleum originally present in a formation can be recovered by primary production, e.g., by allowing the oil to flow to the surface of the earth as a consequence of naturally occurring energy forces, or by so called secondary recovery processes which comprise injecting water into the formation by one or more wells to displace petroleum through the formation toward one or more spaced-apart production wells and then to the surface of the earth. Although waterflooding is an inexpensive supplemental oil recovery process, water does not displace oil effectively even in those portions of the formation through which it passes, because water and oil are immiscible and the interfacial tension between water and oil is quite high. This too has been recognized by persons skilled in the art of oil recovery, and many surface active agents or surfactants have been proposed for addition to the flood water, which materials reduce the interfacial tension between the injected aqueous fluid and the formation petroleum thereby increasing the microscopic displacement efficiency of the injected aqueous fluid. Surfactants which have been disclosed in the prior art for such purposes include alkyl sulfonates, alkylaryl sulfonates, petroleum sulfonates, alkyl- or alkylarylpolyalkoxy sulfates, alkyl- or alkylarylpolyalkoxyalkyl sulfonates, and nonionic surfactants such as polyethoxylated aliphatic alcohols or alkanols, and polyethoxylated alkyl phenols.

Even if the surface tension between the injected aqueous fluid and the petroleum present in the subterranean reservoir can be reduced by incorporating surface active agents into the injected fluid, the total oil recovery efficiency of the process is frequently poor because many subterranean petroleum-containing reservoirs are comprised of a plurality of layers of widely differing permeabilities. When a fluid is injected into such a heterogeneous reservoir, the fluid passes primarily through the most permeable zones and little or none of the fluid passes through the lower permeability zones. If the ratio of permeabilities of the zones is as high as 2:1, essentially all of the injected fluid passes through the more permeable zone to the total exclusion of the less permeable zone. Furthermore, the situation described immediately above causing poor vertical conformance of the injected fluid in a heterogeneous reservoir is aggravated by application of the supplemental oil recovery process itself. If water is injected into a heterogeneous multilayered petroleum reservoir, water passes principially through the most permeable zone and displaces petroleum therefrom, and as a consequence of removing oil, further increases the permeability of that zone. Accordingly, the difference between the permeability of the most permeable zone and the less permeable zone or zones is increased as a consequence of applying a fluid displacement oil recovery process thereto, including waterflooding, surfactant flooding, etc.

The above described problem of poor vertical conformance in waterflooding operations has also been recognized by persons skilled in the art, and numerous processes have been described in the prior art for treating the formation to correct the problems resulting from injecting an oil-displacing fluid into a formation having two or more zones of significantly different permeabilities. Many of these processes involve the use of hydrophilic polymers including partially hydrolyzed polyacrylamide, copolymers of acrylamide and acrylic acid or water soluble acrylates, polysaccharides, etc. Unfortunately, the fluids employing these hydrophilic polymers are substantially more viscous than water at the time of injection, and so injection into the zones is difficult and there is little likelihood that they will invade the same zones as would be invaded by water or another aqueous fluid having about the same viscosity as water. Accordingly, the effectiveness of the above-described processes has been restricted to reducing the permeability of only the most permeable flow channels in a zone, and is furthermore usually restricted only to the near wellbore zone of the formation, e.g. that portion of the most permeable zone in a formation immediately adjacent to the injection well, because of the difficulty of injecting viscous fluids through great portions of the formation.

In view of the foregoing discussion of the problems associated with poor vertical conformance in heterogeneous formations, it can be appreciated that there is a substantial need for a method of treating such formations to reduce the permeability of the very high permeability zones to force subsequently injected oil displacing fluids to pass into those zones which were originally of lower permeability, and so were not invaded by the first injected fluids.

DESCRIPTION OF THE PRIOR ART

Numerous references suggest formulating viscous emulsions on the surface, and injecting the emulsion into a subterranean formation for the purpose of decreasing the permeability of a zone which is substantially more permeable than other zones. These include U.S. Pat. No. 3,149,669; U.S. Pat. No. Re. 27,198 (original U.S. Pat. No. 3,443,636); U.S. Pat. Nos. 3,502,146 (1970); and 3,866,680 (1975). U.S. Pat. Nos. 3,827,497 and 3,890,239 describe use of a fluid containing an organic sulfonate and a sulfated or sulfonated, oxyalkylated alcohol in a surfactant waterflooding oil recovery process.

SUMMARY OF THE INVENTION

I have discovered a process applicable to subterranean, petroleum-containing formations comprising two or more zones, at least one of which has a permeability at least 50 percent greater than at least one other zone, which will permit more effective surfactant waterflooding in both zones. The process involves first injecting the aqueous surfactant fluid into the formation to pass through the more permeable zone, displacing petroleum therefrom, until the ratio of injected fluid to formation petroleum of fluids being recovered from the formation reaches a predetermined or economically unsuitable level. This further increases the ratio of the permeability of the most permeable zone to the permeability of the lesser permeable zone or zones. Oil, which may be crude oil from the same zone, is then injected into the depleted zone and displaced away from the injection well by water, to attain a minimum oil saturation in the depleted zone. Thereafter an aqueous fluid is injected into the formation, which fluid will pass substantially exclusively into and through the most permeable, previously waterflooded zone, which fluid has a viscosity not substantially greater than the viscosity of water, said fluid containing a surfactant mixture which readily emulsifies the oil previously injected and dispersed in the depleted zone. The surfactants present in the injected treating fluid must form an emulsion with the oil at a salinity about equal to the salinity of the aqueous fluid present in the previously flooded, high permeability zone, and should also be relatively stable with changes in salinity since there will normally be variations in water salinity from one point in the subterranean formation to another. The emulsion formed should also be stable with time and changes in salinity at the temperature of the formation, in order to maintain the desired reduction of permeability within the treated zone. After treatment of the previously high permeability zone, the permeability of the treated zone is at least no greater than and preferably less than, the permeability of the other zones. Surfactant fluid is then injected into the formation, and passes through the zones not contacted by surfactant fluids previously, and therefore recovers oil therefrom.

DESCRIPTION OF THE PREFERRED EMBODIMENTS

Briefly, the process of my invention comprises a method of treating a subterranean formation containing at least two zones whose permeabilities are sufficiently different from one another that a fluid injected into a well in communication with both zones will pass primarily through the more permeable zone. Ordinarily, for example, if the permeability of one zone to the flow of the injected fluid is at least 50 percent greater than and certainly if it is 100 percent greater than the permeability of the other zone, fluid injected into wells in fluid communication with both zones will pass largely into and through the more permeable zone. If a surfactant waterflood process is applied to such a formation, the majority of the surfactant fluid will pass into the more permeable zone and will displace petroleum in that zone towards the production well, with little or no oil displacement occurring in the less permeable zone. After oil has been displaced through the more permeable zone and oil recovery has proceeded to the point at which water breakthrough has occurred at the production well, continued injection of surfactant fluid into the well in communication with both zones will accomplish substantially no additional oil recovery even though the oil saturation in the lesser permeable zone may be substantially the same as it was before commencing the surfactant waterflood.

Attempts to treat a situation such as that described above by techniques taught in the prior art have been at best only partially successful for a variety of reasons. Injecting of viscous fluid, which may be either an emulsion formed on the surface for the purpose of plugging the more permeable zone, or a viscous, aqueous solution of a hydrophilic polymer such as polyacrylamide, partially hydrolyzed polyacrylamide, copolymers of acrylamide and acrylates, polysaccharides, etc., are generally not entirely satisfactory because the viscous fluid only invades the largest flow channels of the formation, and so does not invade all of the flow channels which would be invaded by a fluid whose viscosity was lower, e.g. more nearly equal to the viscosity of water. Furthermore, emulsions formed by, for example, adding caustic and water to crude oil are not particularly stable with time nor are they stable with variations in the salinity of fluids which they may contact. Thus an emulsion which effectively plugs the larger flow channels of a high permeability zone, including one which has previously been waterflooded, may be broken later either as a consequence of the passage of time, or as the emulsion contacts pockets of water having greater or less salinity, such as are frequently found in most subterranean reservoirs. Moreover, there are problems associated with adsorption of hydrophilic polymers, and furthermore many of the hydrophilic polymers are not sufficiently temperature stable to permit their use in even moderately high temperature formations.

Since my process requires the formation of a viscous emulsion in the flow channels of the high permeability, depleted zone or zones in a formation, the zones to be treated with the aqueous fluid containing the emulsifying surface active agents must contain at least 8% and preferably at least 25% oil for the viscous emulsion to be formed. While the residual oil saturation following waterflooding is usually adequately high to permit forming the emulsion, the residual oil saturation after surfactant waterflooding is usually inadequate. Moreover, the oil saturation is generally less in the zone adjacent to the injection well than at distances away from the injection well. Accordingly, when this process is used after surfactant waterflooding it is necessary to raise the concentration of oil in the high permeability zone especially in the vicinity of the injection well prior to injecting the aqueous emulsion-forming fluid if the oil saturation is below the above-mentioned critical levels. This is accomplished by injecting oil, preferably crude petroleum from the same formation, into the formation via the injection well and thereafter displacing it into the zone to re-establish a residual oil saturation similar to that remaining after waterflooding. Other hydrocarbons such as diesel oil or kerosene may also be used, but crude oil is the preferred hydrocarbon for use. It is desired to inject a volume of oil equivalent to from 10 to 50 and preferably from 25 to 35 pore volume percent based on the pore volume of the depleted zone being treated. Alternatively, it is satisfactory to inject from 15 to 2000 and preferably from 100 to 500 gallons of oil per foot of thickness of high permeability zone being treated (186.3 to 24,836 and preferably from 1242 to 6209 liters per meter).

After injection of oil into the zone, water should be injected to partially displace the oil away from the injection well and achieve an oil saturation distribution in the depleted zone greater than that which remains after completion of surfactant waterflooding. The desired oil saturation is from 8 to 35 and preferably 25 to 35 percent of the port volume. The desired distribution is accomplished by injecting from 1 to 160 and preferably 7 to 40 barrels of water per foot (521.6 to 77,861 and preferably 3651 to 20,862 liters of water per meter) of zone treated. Alternatively, the volume of water injected should be from 0.5 to 10 and preferably from 1 to 3 times the volume of oil injected. The water injected into the zone should not contain any surface active agent. It is preferred that the salinity and divalent ion content of the water be about equal to the salinity and divalent ion content of the water in the zone being treated, as the emulsifying surfactant to be injected into the formation after completion of the above described process, will be tailored to exhibit optimum performance at this salinity and divalent ion concentration.

The emulsifying fluid injected into the formation next in applying the process of my invention is an aqueous liquid e.g. a solution or dispersion containing one or more surfactants, or surface-active agents, which are carefully chosen individually and in the case of multi-component systems, their relative proportions selected on the basis of displaying optimum emulsification characteristics. The aqueous liquid is either oil-free or the oil content is below the level which would increase the viscosity to a value substantially greater than the viscosity of water. Preferably the viscosity of the fluid is no more than twice the viscosity of water. The surfactants which are effective for this purpose, e.g. for forming gross marco-emulsions suitable for plugging the flow channels of the formation, are not suitable for low surface tension flooding operations, and will not produce optimum oil displacement in a formation if utilized in a surfactant waterflooding process. The reasons the surfactants suitable for use in the process of this invention are ineffective for waterflooding operations is believed to be associated with the fact that when an emulsion is formed, essentially all of the surface active agents which participate in the emulsification reaction, are concentrated at the interface between the discontinuous and continuous emulsion phases, and so little surfactants remain in the aqueous solution, and so cannot reduce the interfacial tension between the formation petroleum and the aqueous fluid present in the flow channels as is necessary to achieve efficient low surface tension displacement of petroleum.

It is necessary that the surfactants utilized in the process of my invention be stable and effective for emulsification in an aqueous fluid having a salinity about equal to the average salinity of the aqueous fluid present in the flow channel of the high permeability zone, e.g. the zone into which the treating fluid is to be injected. Preferably, the surfactant should be identified by tests utilizing actual fluids from the formation, including brine and formation petroleum, since particular characteristics of any of these fluids will affect the efficiency of the surfactant for emulsification of formation petroleum and injected aqueous fluid.

Numerous surfactants or combinations of surfactants may be employed in my process. The preferred class of emulsifying surfactant is usually determined by the formation temperature and the salinity and divalent ion concentration of the water present in the portion of the formation being treated.

In fresh water-containing formations, e.g. where the salinity is less than about 15,000 parts per million total dissolved solids, a preferred system comprises from 0.5 to 5.0 percent by weight of petroleum sulfonate whose equivalent weight is from 300 to 500, or a $C_9$ to $C_{18}$ alkyl sulfonate or alkylaryl sulfonate such as benzene or toluene having at least one $C_9$ to $C_{18}$ alkyl side chain, in combination with from 0.5 to 4.0 percent by weight of a low HLB, low water solubility or water insoluble nonionic surfactant such as an ethoxylated alkanol or an ethoxylated alkylphenol, having from 2 to 8 ethoxy groups per molecule.

In applying the process of my invention to high salinity, high temperature formations, e.g. where the salinity is in excess of 15,000 parts per million total dissolved solids and the temperature exceeds 150° F. (66° C.), the following surfactant mixture may be used.

(1) A sulfonate and ethoxylated surfactant having the following formula:

$$R-(OR')_n-R''SO_3M \qquad (1)$$

wherein R is an aliphatic group, preferably an alkyl, linear or branched, having from 9 to 25 and preferably from 12 to 18 carbon atoms, or an alkylaryl group such as benzene, toluene or xylene having attached thereto at least one alkyl group, linear or branched, having from 9 to 15 and preferably from 10 to 13 carbon atoms; R' is ethylene or a mixture of ethylene and higher molecular weight alkylene with relatively more ethylene than higher molecular weight alkylene, n is a number including fractional numbers, from 2 to 10 and preferably from 3 to 7; R'' is ethylene, propylene, hydroxy propylene, or butylene; and M is a monovalent cation such as sodium, potassium, lithium or ammonium.

(2) An organic sulfonate anionic surfactant such as an alkyl sulfonate, alkyaryl sulfonate, a petroleum sulfonate or a mixture thereof. In the case of the alkyl or alkylaryl sulfonate, the alkyl group, which may be linear or branched, will ordinarily contain from 8 to 20 and preferably from 9 to 18 carbon atoms. The petroleum sulfonate will usually be predominantly water soluble, and the average equivalent weight should be from 250 to 600 and preferably from 300 to 500.

The concentration of the alkyl or alkylarylpolyalkoxyalkylene sulfonate surfactant will ordinarily be in the range of from about 0.5 to about 4.0 percent by weight. The concentration of the organic sulfonate surfactant should be from about 0.01 to about 10 and preferably from about 0.2 to about 5.0 percent by weight. The ratio of organic sulfonate surfactant to the alkyl or alkylarylpolyalkoxyalkylene sulfonate will ordinarily be from about 0.1 to about 1.5, depending on the salinity of the fluid in which it is formulated, which in turn is usually about equal to the salinity of the fluid present in the subterranean formation.

In another embodiment, the fluid contains from 0.5 to 4.0 percent by weight of the ethoxylated and sulfonated surfactant described above, alone or with the organic sulfonate, and a water insoluble, low HLB nonionic surfactant such as an ethoxylated $C_{10}$ to $C_{20}$ alkanol or ethoxylated $C_9$ to $C_{15}$ alkylphenol containing from 2 to 8 ethoxy groups per molecule. This combination is effective for use in formations containing water whose salinity is from 20,000 to 150,000 and whose temperature is from 70° to 180° F.

Another embodiment is suitable for moderate temperature formation containing high salinity water. Where the formation temperature is less than 150° F. (66° C.) and the formation water salinity is from 30,000 to 240,000 parts per million total dissolved solids, the following combination is effective.

(1) From 0.5 to 5.0 percent by weight of a sulfated and ethoxylated surfactant having the following formula:

$$R_a O(R_a'O)_{na} SO_3 M_a \quad (2)$$

wherein $R_a$ is an aliphatic group, preferably an alkyl, linear or branched, having from 9 to 25 and preferably from 12 to 18 carbon atoms, or an alkylaryl group such as benzene, toluene or xylene having attached thereto at least one alkyl group, linear or branched, having from 9 to 15 and preferably from 10 to 13 carbon atoms; O is oxygen; $R_a'$ is ethylene or a mixture of ethylene and higher molecular weight alkylene with relatively more ethylene than higher molecular weight alkylene; na is a number including fractional numbers, from 2 to 10 and preferably from 2 to 7; S is sulfur; and $M_a$ is a monovalent cation such as sodium, potassium, lithium or ammonium.

(2) A low HLB, essentially water-insoluble nonionic surfactant having the following formula:

$$R_b(OR_b')_{nb}OH \quad (3)$$

wherein $R_b$ is an aliphatic, such as branched or linear alkyl, containing from 9 to 25 carbon atoms and preferably from 12 to 18 carbon atoms, or an alkylaryl group such as benzene, toluene or xylene having attached thereto at least one alkyl group, linear or branched, containing from 9 to 15 and preferably from 10 to 13 carbon atoms in the alkyl chain; $R_b'$ is ethylene or a mixture of ethylene and higher alkylene such as propylene with relatively more ethylene than higher alkylene; and nb is a number, either whole or fractional, from 1 to 10 and preferably from 2 to 6.

The volume of treating fluid to be injected into the formation when applying the process of my invention is ordinarily from about 1.0 to about 100 and preferably from 10 to 50 pore volume percent, based on the pore volume of the high permeability zone or zones to be contacted by the treating fluid. It is important to note that the pore volume on which these numbers are based relate to the pore volume of the high permeability zone or zones to be treated, not the pore volume of the portion of the whole formation within the recovery zone defined by the wells utilizing in the process.

The procedural steps involved in applying the process of my invention to a subterranean formation are best understood by referring to the following description of a pilot field example.

A subterranean, petroleum-containing formation located at depth of about 5800 feet was nearing the end of waterflood. The total thickness of the formation was 78 feet. The average salinity of the formation water was 85,000 parts per million total dissolved solids including 10,000 parts per million divalent ions, e.g. calcium and magnesium. The formation temperature was 109° F. (43° C.). The formation was not homogeneous in terms of permeability, however; rather, the formation was made up of five separate strata or layers. The initial oil saturation in all layers was approximately 30 percent. The thickness and permeability of each zone is given in Table I below.

TABLE I

| Zone | Thickness Feet | Permeability Millidarcies |
|------|----------------|---------------------------|
| 1 | 1 | 46 |
| 2 | 6 | 16 |
| 3 | 6 | 11 |
| 4 | 17 | 6 |
| 5 | 48 | 1 or less |

An aqueous fluid containing 0.4 percent by weight of the sodium salt of dodecylbenzene sulfonate (median equivalent weight of 384) and 0.6 percent by weight of a 10.6 mole ethylene oxide adduct of nonylphenol was injected into the injection well which is in fluid communication with the full vertical thickness of the formation, i.e., all strata of the formation. Since the permeability of the top stratum is substantially greater than the lower strata, the surfactant fluid flowed much more readily into the top stratum, and all of the oil production obtained as a consequence of surfactant fluid injection was in fact derived from the top stratum. It should be noted that this was not necessarily apparent to operators on the surface of the earth, however. Surfactant fluid injection continued and an interface was formed in each stratum between the injected waterflood and the oil bank formed as a consequence of the surfactant flood. Surfactant fluid breakthrough occurred at the production well, first from the top, and somewhat later from the next two strata. Once breakthrough occurred further injection of surfactant fluid or drive water into the injection well will not recover any significant amount of additional oil from either of the lower strata. All of the fluid injected after breakthrough of fluid at production well will pass into and through the upper three strata, and essentially no additional fluid will pass into the lower two strata. Thus the interfaces in the top strata remained approximately where they were at the time of fluid breakthrough into the production well from the upper three strata, no matter how much additional surfactant fluid or water was thereafter injected into the injection well and flowed through the reservoir. At this time oil production dropped off rapidly until further fluid injection and oil production were no longer economically feasible.

The water that has been utilized for waterflooding is itself from the same formation, and so the salinity of the water being injected into the formation and the salinity of water naturally present in the formation are about the same, and it was determined that in this formation the salinity of this water was approximately 85,000 parts per million total dissolved solids including 10,000 parts per million divalent ions, principally calcium and magnesium. The formation temperature was 109° F. (43° C.). A treating fluid suitable for use in this salinity environment and at the temperature of the formation, was formulated and the surfactant was chosen by a series of laboratory experiments conducted at formation temperature and employing actual samples of field water and petroleum from the formation into which the treating fluid was to be injected. After a series of laboratory tests, essentially similar to those to be described more fully later hereinafter below, it was determined that a preferred emulsifying fluid for use in reducing the permeability of the more permeable zones contains (1) 1.6 percent of the sodium dodecylbenzenetriethoxyethylene sulfonate containing an average of 3 ethoxy groups per molecule and (2) 0.76 percent of a 3 mole ethylene oxide adduct of dodecylphenol.

The following procedure was used in treating the formation to effect an adjustment in the unfavorable permeability distribution of the five strata in the formation.

The first step involved injecting 40 barrels (1680 gal, 6359 liters) of crude oil from the same formation, into the formation via the injection well. This is equivalent to 129 gallons per foot based on the thickness of the top three zones. The injection pressure was maintained relatively constant at 1750 pounds per square inch during injection of oil and other fluids described herein.

Next, 140 barrels (5800 U.S. gallons, or 22,256 liters) of field brine (salinity of 85,000 parts per million) was injected overnight. The pressure was again maintained at 1750 psi.

Next, 125 barrels (5250 U.S. gallons or 19,871 liters) of the treating solution containing 1.6% sodium dodecylbenzenetriethyoxyethylene sulfonate and 0.76 percent 3.0 mole ethylene oxide adduct of dodecylphenol was injected at a constant injection pressure of 1750 psi.

The above fluids were followed with field brine injection. The pressure was maintained at 1750 psi and the volume flow rate was monitored. Before treatment, the injection rate was 466 barrels per day. Immediately after treatment, the injection rate of brine was essentially unchanged. The flow rate declined slowly until after five days, the injection rate was 320 barrels per day. This indicates that the desired gradual development of viscosity as the emulsion is formed in situ, had been achieved.

Based on the permeability values and zone thickness, it was calculated that the treatment depths into the zones is as given in Table II below.

TABLE II

| Zone | Zone Thickness, Feet | Permeability | Calculated Treatment Radius, Feet |
|---|---|---|---|
| 1 | 1 | 46 | 15 |
| 2 | 6 | 16 | 10 |
| 3 | 6 | 11 | 8 |
| 4 | 17 | 6 | 5 |
| 5 | 48 | 1 or less | 2 |

It can be seen from the above data that the treatment was effective at greater distances from the injection well in the most permeable zone, which is the desired result.

After completion of the above described multi-step waterflood with intermittent treatment to alleviate the adverse permeability distribution problem, the formation may thereafter be subjected to additional surfactant waterflooding since the permeability of the formation has now been made more homogeneous and there still remains a substantial amount of petroleum in those strata not originally depleted, sufficient to justify the injection of an effective, low surface tension oil displacing fluid into these strata.

A series of laboratory tests were conducted to illustrate how slight changes in surfactant molecular characteristics affect emulsification effectiveness of certain preferred surfactants. These tests comprised mixing together 5 cc's of oil and 30 cc's of the one percent surfactant solution in an 85 kilogram/meter$^3$ (85,000 ppm) brine. The solutions were heated to a temperature of 109° C. (228.2° F.) and shaken periodically over an eight hour period. The solutions were than allowed to equilibrate for several days, and the volume of emulsion and total volume of fluid including the emulsion, the oil and the aqueous phase, were observed. The figures reported in Table III below under volume ratio represents the volume of emulsion divided by the total volume of fluid, including emulsion and separate phases of the field brine and any unemulsified oil that may have been present. It can be seen that a change in the number of ethoxy groups of only 0.2 causes a very significant change in the emulsification effectiveness of the surfactant.

TABLE III

| Run | Average number of moles of ethylene oxide per mole of surfactant[1] | Emulsification ratio (volume of emulsion ÷ total fluid volume) |
|---|---|---|
| A | 2.6 | 0.02 |
| B | 2.8 | 0.39 |
| C | 3.0 | 0.02 |
| D | 3.2 | 0.00 |
| E | 3.4 | 0.00 |

[1]One percent of dodecylbenzenepolyethoxyhydroxypropylene sulfonate.

For the purpose of further illustrating the types of fluids suitable for use in the process of my invention, and illustrating the results obtainable from application thereof, a series of laboratory experiments were performed. Laboratory equipment was especially constructed for these tests, and comprised essentially two separate formation earth core samples encased in holders and arranged for flooding, with the two cores being placed in parallel to simulate the situation similar to that described above, in which an injection well is in communication with two earth strata of substantially different permeabilities. Fluids injected into the apparatus will pass predominantly through the highest permeability core to the exclusion of the other core. In all of the experiments described below, the cores were separately waterflooded to an irreducable oil saturation prior to being connected in parallel for the purpose of studying the effect of the adverse permeability distribution-correcting treatment of my invention.

In Run E, core (1) was a fresh Berea limestone core having a permeability of 704 millidarcy. The core was 5.08 cm in diameter and 15.8 cm in length and had a total pore volume of 73 cubic centimeters. The porosity was 23 percent. The residual oil saturation after waterflooding was 25 percent (Core (2) utilized in Run F was a similar size core having a pore volume of 65 cubic centimeters and a porosity of 20 percent, but a much lower permeability, only 139 millidarcy. The residual oil saturation of Core (2) after waterflooding was 35 percent. After the cores were flooded to an irreducable water saturation and mounted in parallel, water injection into the cores at a flow rate of 0.9 cc per minute resulted in a receptivity ratio (the ratio of the volume of fluid injected into core (1) divided by the volume of fluid injected into core (2) during the same period, when the cores are connected in parallel) of approximately 5.8. During the treatment procedure the receptivity ratio declined to 4.7 and levelled off at 4.0 during the subsequently applied waterflood operation. A quantity of petroleum sulfonate solution was then injected, and during the surfactant flood portion of the test, the receptivity declined still further to 2.4. No isolation slug was used between the emulsification slug and the petroleum sulfonate slug, and internal mixing of the two fluids enhanced the emulsification plugging effect. A polymer mobility control buffer was then injected into the system, and the receptivity ratio increased to 4.2 after 0.2 pore volumes of the polymer solution had been injected, and then rose to 5.6 after 1 pore volume of polymer had been injected. It is believed that the increase in receptivity ratio resulting from the fact that the polymer was dissolved in fresh water, which broke the emulsion formed in the course of the treatment procedure described above. Nevertheless, Run E clearly illustrates how treatment of two cores in a parallel arrangement, which cores have widely different permeabilities, reduces the permeability deviation between the two cores and improve the receptivity ratio dure, the receptivity ratio declined to 2.8 and levelled off at 1.0 during the subsequently applied waterflood operation. A receptivity ratio of 1 was maintained during injection of petroleum sulfonate solution and the ratio fluctuated between 1.6 and 0.6 during a polymer solution injection. Experiment G clearly illustrates that the alkylarylpolyethoxyalkylene sulfonate-nonionic mixture is a preferred combination to reduce the permeability deviation between two packs.

The data obtained from runs, E, F and G are contained in Table IV below.

TABLE IV

| Run | Core or Pack | Initial Permeability to Water | Volume of Treating Fluid | Material Used | Receptivity Ratios Prior To Treatment | After Treatment | Δ After Treatment / Δ Before Treatment |
|---|---|---|---|---|---|---|---|
| E | (1) | 704 | .14 | 2 | 5.8 | 4.0[1] | — |
|   | (2) | 139 | .03 |   |   |   |   |
| F | (3) | 75 | 0.13 | 2 | — | — | 4.0 |
|   | (4) | 65 | 0.17 |   | — | — | 1.4 |
| G | (5) | 96 |  | 3 | 4.6 | 1.0 | — |
|   | (6) | 20 |  |   |   |   |   |

[1]Reduced to 2.4 on injecting petroleum sulfonate oil displacing fluid
[2]Dinonylphenol (3.8) polyethoxyethyl sulfonate
[3]Dodecylphenol (3.0) polyethoxyethyl sulfonate + dodecylphenol (3.0) polyethoxylate from 5.8 to a low of 2.4, which is substantially less than half of the original receptivity ratio.

Run F was performed to verify that in situ emulsification was the mechanism responsible for the improvement in receptivity noted in experiment E above. In Run F, two packs of crushed formation core material were formulated and cleaned. Pack (3) was saturated with crude oil and pack (4) was not. Pack (3) was waterflooded to an irreducable oil saturation prior to the treatment. Both packs were treated with 13 pore volume percent of a 30 kilogram/meter$^3$ solution of dinonylphenolpolyethoxyethylene sulfonate (3.8 moles ethylene oxide per mole surfactant) and finally flooded with field brine. In this experiment, the packs were not flooded in parallel as was the case in Run E above but rather were independently flooded after treatment with the emulsifying fluid. The pressure differential across the packs was determined during the course of the treatment and subsequent waterflood as an indication of increasing resistance to fluid flow through the packs. Pack (3), which was originally saturated with oil, waterflooded and then treated, experienced a four-fold increase in the pressure required to flood with water in a constant rate flood whereas pack (4), which contained essentially no oil prior to the treatment, experienced less than a 50 percent increase in differential pressure during the course of approximately 3 pore volumes of waterflood. Run F clearly illustrates that oil must be present in the treated formation for the injectivity-reducing emulsification phenomena to be achieved, which is necessary for the treatment described herein to accomplish the desired objective of reducing the permeability of the high permeability zone.

Experiment G was comparable to experiment E, except the treating solution contained 13.6 kg/m$^3$ dodecylbenzenetriethoxyethylene sulfonate with 7.6 kg/m$^3$ of a 3.0 mole ethylene oxide adduct of dodecylphenol and packs were formulated from crushed formation core material. Pack (5) had 96 millidarcy permeability and Pack (6) had 20 millidarcy permeability. After the packs were each flooded to irreducable water saturation and mounted in parallel, water injection into the cores at a flow rate of 1.0 cm$^3$ per minute in a receptivity ratio (Pack (5)/Pack (6)) of 4.6. During the treatment proce- While the above discloses mixing the two essential surfactants in a single fluid, two or more fluids each containing only one component can be injected sequentially so as to achieve mixing in the formation. In certain applications, there is an advantage to this embodiment in that emulsification is delayed and greater in depth treatment of the high permeability zone is achieved. Similarly, repetative cycles of injecting oil and water may be used rather than the single oil slug followed by water injection, and may be a preferred embodiment in attaining greater depth of treatment.

Thus I have disclosed and demonstrated how it is possible to treat a formation containing two or more strata of substantially different permeabilities so as to reduce the permeability of the more permeable strata, by injecting oil followed by water followed by an aqueous emulsifying fluid which forms a gross macro-emulsion with residual and injected oil in the flow channels of the flooded portion of a formation after waterflooding, thereby reducing the permeability difference between the strata, after which water surfactant fluid or other oil displacing fluids may be injected into the formation with substantially improved vertical conformance over that which would be obtained without the permeability adjusting treatment of my invention.

While my invention has been described in terms of a number of illustrative embodiments, it is clearly not so limited since many variations thereof will be apparent to persons skilled in the art of oil recovery without departing from the true spirit and scope of my invention. It is my desire and intention that my invention be limited only by those limitations and restrictions appearing in the claims appended immediately hereinafter below.

I claim:

1. A method of recovering petroleum from a subterranean, petroleum-containing formation, said formation containing water having a salinity of from 5000 to 240,000 parts per million total dissolved solids, said formation containing at least two distince petroleum-containing strata, the permeability of at least one stratum being at least 50 percent greater than the permeability of the other stratum, said formation being penetrated by at least one injection well and by at least one production well, both wells being in fluid communication with substantially all of the strata of said formation, comprising (a) injecting a first aqueous surfactant-containing oil-displacing fluid into the formation via the injection well, said fluid passing through at least one of the more permeable strata of said formation and displacing oil therein toward the production well, from which it is recovered to the surface of the earth;

(b) after said first aqueous oil displacing fluid has passed through at least one of said more permeable strata to the production well, discontinuing injected said fluid and injecting an amount of petroleum into the formation sufficient to raise the average oil saturation in the portion of the more permeable strata of the formation being treated to at least ten percent;

(c) injecting water or brine to displace petroleum injected in step (b) away from the injection well and distribute it in the portion of the strata to be treated;

(d) injecting an aqueous treating liquid whose viscosity is no more than twice the viscosity of water, said liquid containing at least one surfactant which is capable of producing a stable viscous oil-in-water emulsion with the petroleum present in the zone being treated at formation temperature and at a salinity about equal to the salinity of the formation water;

(e) thereafter injecting a second surfactant-containing, oil-displacing fluid into the formation to pass through and displace petroleum from at least one strata of the formation not depleted in step (a), and recovering oil from the formation via the production well.

2. A method as recited in claim 1 wherein said surfactant of said aqueous treating liquid of step (d) comprises (1) an aliphaticpolyalkoxyalkylene sulfonate or alkylarylpolyalkoxyalkylene sulfonate having the following formula:

$$R-(OR')_n-R''SO_3M$$

wherein R is an alkyl, linear or branched, having from 9 to 25 carbon atoms or an alkylaryl group selected from the group consisting of benzene, toluene or xylene having attached thereto at least one alkyl group, linear or branched, said alkyl group containing from 9 to 15 carbon atoms; R' is ethylene or a mixture of ethylene and higher molecular weight alkylene with relatively more ethylene than higher molecular weight alkylene; n is a number including fractional numbers from 2 to 10; R'' is ethylene, propylene, hydroxypropylene, or butylene and M is a monovalent cation selected from the group consisting of sodium, potassium, lithium and ammonium, and (2) an organic sulfonate which is at least partially water soluble.

3. A method as recited in claim 2 wherein the aqueous treating liquid of step (d) also contains a third component comprising a nonionic surfactant having the following formula:

$$R_a(OR_a')_{na}OH$$

wherein $R_a$ is an aliphatic, including a branched or linear alkyl, containing from 9 to 25 carbon atoms, or an alkylaryl group including benzene, toluene or xylene having attached thereto at least one alkyl group, linear or branched, containing from 9 to 15 carbon atoms, $R_a'$ is ethylene or a mixture of ethylene and higher alkylene such as propylene with relatively more ethylene than propylene; and na is a number either whole or fractional, from 2 to 10.

4. A method as recited in claim 3 wherein the concentration of nonionic surfactant is from about 0.10 to about 5.0 percent by weight.

5. A method as recited in claim 2 wherein R is an alkyl group containing from 12 to 18 carbon atoms.

6. A method as recited in claim 2 wherein R is alkyaryl group and the number of carbon atoms in the alkyl group is from 9 to 13.

7. A method as recited in claim 2 wherein R is alkylbenzene.

8. A method as recited in claim 2 wherein R' is ethylene.

9. A method as recited in claim 2 wherein the value of n is from 2 to 7.

10. A method as recited in claim 2 wherein R'' is ethylene.

11. A method as recited in claim 2 wherein R'' is propylene.

12. A method as recited in claim 2 wherein R'' is hydroxy propylene.

13. A method as recited in claim 2 wherein R'' is butylene.

14. A method as recited in claim 2 wherein the concentration of the aliphaticpolyalkoxyalkylene sulfonate is from about 0.01 to about 10.0.

15. A method as recited in claim 2 wherein the concentration of organic sulfonate surfactant is from about 0.5 to about 4.0.

16. A method as recited in claim 1 wherein the volume of aqueous treating liquid of step (d) is from about 1.0 to about 100 pore volume percent based on the pore volume of the strata to be treated thereby.

17. A method as recited in claim 16 wherein the volume of fluid is from about 10 to about 50 pore volume percent.

18. A method as recited in claim 1 wherein the volume of petroleum injected in step (b) is from 0.3 to 50 barrels per foot of formation to be treated.

19. A method as recited in claim 1 wherein the volume of petroleum injected in step (b) is from 2 to 12 barrels per foot of formation to be treated.

20. A method as recited in claim 1 wherein the volume of water or brine injected in step (c) is from 0.5 to 10 times the volume of petroleum injected in step (b).

21. A method as recited in claim 1 wherein the volume of water or brine injected in step (c) is from 0.5 to 3 times the volume of petroleum injected in step (b).

22. A method as recited in claim 1 comprising repeating steps (b) and (c) at least once.

23. A method as recited in claim 1 wherein the emulsifying surfactant comprises an ethoxylated and sulfated surfactant of the following formula:

$$R_bO(R_b'O)_{nb}SO_3M$$

wherein $R_b$ is an alkyl, linear or branched having from 12 to 18 carbon atoms, or an alkylaryl containing from 9 to 15 carbon atoms in the alkyl chain, $R_b'$ is ethylene or a mixture of ethylene and higher alkylene with relatively more ethylene than higher alkylene, nb is a number from 2 to 10, S is sulfur and M is sodium, potassium, lithium or ammonium; and a low HLB, essentially water-insoluble nonionic of the following formula:

$$R_c(OR_c')_{nc}OH$$

wherein $R_c$ is a $C_9$ to $C_{25}$ alkyl, linear or branched, or an alkylaryl containing from 9 to 15 carbon atoms in the alkyl chain, $R_c'$ is ethylene, and nc is a number from 1 to 10.

* * * * *